United States Patent [19]

Ost et al.

[11] 3,716,587

[45] Feb. 13, 1973

[54] N-(PHENYL OR BENZYL)-N,N'-BIS-(1-AMINO-2,2,2-TRICHLORO)-ETHYL)ALKYLENIAMINES

[75] Inventors: Walter Ost, Klaus Thomas, Dietrich Jerchel, all of Ingelheim/Rhine; Karl-Richard Appel, Biberach-Rissegg, all of Germany

[73] Assignee: C. H. Boehringer Sohn, Ingelheim/Rhine, Germany

[22] Filed: March 25, 1971

[21] Appl. No.: 128,168

Related U.S. Application Data

[63] Continuation-in-part of Ser. No. 793,187, Jan. 22, 1969, Pat. No. 3,595,916.

[52] U.S. Cl. ............................................. 260/562 P
[51] Int. Cl. ............................................. C07c 103/30
[58] Field of Search ............................................. 260/562

[56] References Cited

UNITED STATES PATENTS 3,520,927  7/1970  Malz et al. ............................................. 260/562

Primary Examiner—Harry I. Moatz
Attorney—Hammond & Littell

[57] ABSTRACT

Compounds of the formula

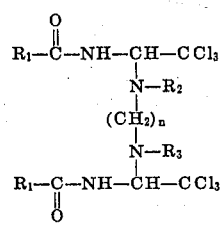

wherein $R_1$ is hydrogen, alkyl of one to four carbon atoms or trichloromethyl, $R_2$ is phenyl, benzyl, chlorophenyl, dichlorophenyl, chlorobenzyl, dichlorobenzyl, bromophenyl or dibromophenyl, $R_3$ is hydrogen, phenyl, benzyl or dichlorophenyl, bromophenyl or dibromophenyl, and $n$ is 1, 2 or 3;

the compounds are useful as fungicides.

20 Claims, No Drawings

N-(PHENYL OR BENZYL)-N,N'-BIS-(1-AMINO-2,2,2-TRICHLORO)-ETHYL)ALKYLENEAMINES

This is a continuation-in-part of copending application Ser. No. 793,187, filed Jan. 22, 1969, now U.S. Pat. No. 3,595,916.

This invention relates to novel N-(phenyl or benzyl)-N,N'-bis-[(1-amido-2,2,2-trichloro)-ethyl]-alkylenediamines, as well as to a method of preparing these compounds.

More particularly, the present invention relates to compounds of the formula

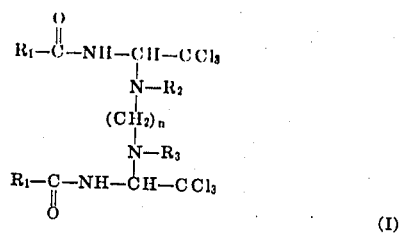

wherein $R_1$ is hydrogen, alkyl of one to four carbon atoms or trichloromethyl, $R_2$ is phenyl, benzyl, chlorophenyl, dichlorophenyl, chlorobenzyl, dichlorobenzyl, bromophenyl or dibromophenyl, $R_3$ is hydrogen, phenyl, benzyl or dichlorophenyl, bromophenyl or dibromophenyl, and $n$ is 1, 2 or 3.

A compound of the formula I may be prepared by methods involving well known chemical principles, among which the following has proved to be particularly convenient and efficient:

By reacting a compound of the formula

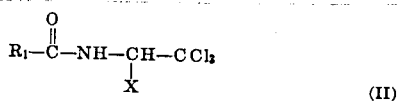

wherein $R_1$ has the same meanings as in formula I and X is a substituent which may easily be split off in the form of an anion, such as chlorine, bromine, arylsulfonyloxy, alkylsulfonyloxy, aryloxy, trifluoroacetoxy or arylcarbonyl-oxy, with an alkylenediamine of the formula

wherein $R_2$, $R_3$ and $n$ have the same meanings as in formula I, pursuant to the reaction formula

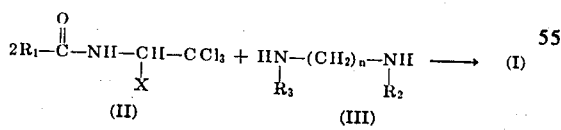

The reaction is preferably carried out in the presence of an inert organic solvent, such as tetrahydro-furan, dioxane, toluene, acetone or a chlorinated hydrocarbon, at a temperature between about −20° and +100° C., preferably between +20° and +40° C.

When X in formula II is chlorine or bromine, it is advantageous to add to the reaction mixture an equivalent amount of a tertiary amine, such as triethylamine. In those instances it is assumed that a reactive intermediate of the formula $R_1-CO-N=CH-CCl_3$ is formed, which then reacts further to undergo an addition reaction with the diamine III and forms a compound of the formula I.

The end products of the formula I obtained in this manner are weak bases; some of them are colorless crystalline solids which are sparsely soluble in water, while others are oily or glassy-amorphous substances which may be purified by way of their hydrohalic acid addition salts. However, all of the bases are relatively easily soluble in dimethylsulfoxide, tetrahydrofuran, cyclohexanone, dimethylformamide, N-methyl-pyrrolidone and butyrolactone.

The starting compounds of the formula II may be prepared pursuant to known processes, such as by exchange of the hydroxyl group in a compound of the formula $R_1-CO-NH-CHOH-CCl_3$ for a substituent X, as defined in connection with formula II above.

The following examples further illustrate the present invention and will enable others skilled in the art to understand it more completely. It should be understood, however, that the invention is not limited solely to the particular examples given below.

EXAMPLE 1

N,N'-Bis-phenyl-N,N'-bis-[(1-formamido-2,2,2-trichloro)-ethyl]-ethylenediamine.

A mixture consisting of 0.04 mol of N,N'-bis-phenyl-ethylenediamine, 8.3 gm (0.08 mol +3 percent) of triethyl-amine and 50 cc of dry tetrahydrofuran was added dropwise over a period of 1 hour to a solution of 16.9 gm (0.08 mol) of N-[(1,2,2,2-tetrachloro)-ethyl]-formamide in 80 cc of dry tetrahydrofuran, accompanied by stirring. Thereafter, the reaction mixture was stirred at room temperature for one hour more, the precipitated triethylamine hydrochloride was separated by vacuum filtration, and the filtrate was evaporated in vacuo at 40°-50° C. The oily residue crystallized upon being digested with ether, yielding 74 percent of theory of N,N'-bis-phenyl-N,N'-bis-[(1-formamido-2,2,2-trichloro)-ethyl]-ethylenediamine, m. p. 168°-170° C. (decomp.), of the formula

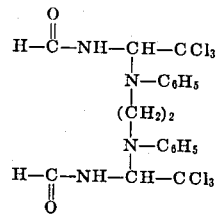

EXAMPLE 2

Using a procedure analogous to that described in Example 1, N,N'-bis-phenyl-N,N'-bis-[(1-pivalylamino-2,2,2-trichloro)-ethyl]-ethylenediamine, m. p. 124°-126° C. (decomp.), of the formula

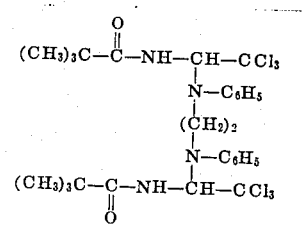

was prepared from N-[(1,2,2,2-tetrachloro)-ethyl]-pivalyl-amine and 1,2-dianilino-ethane. The yield was 55 percent of theory.

EXAMPLE 3

Using a procedure analogous to that described in Example 1, N,N'-bis-phenyl-N,N'-bis-[(1-trichloroacetamido-2,2,2-trichloro)-ethyl]-ethylenediamine, m.p. 176°–180° C. (decomp.), of the formula

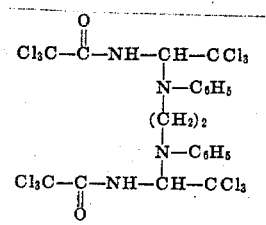

was prepared from N-[(1,2,2,2-tetrachloro)-ethyl]-trichloro-acetamide and 1,2-dianilino-ethane. The yield was 33 percent of theory.

EXAMPLE 4

Using a procedure analogous to that described in Example 1, N,N'-bis-benzyl-N,N'-bis-[(1-formamido-2,2,2-trichloro)-ethyl]-ethylenediamine, an amorphous substance, m. p. about 50° C., of the formula

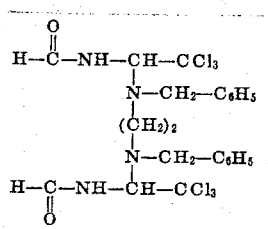

was prepared from N-[(1,2,2,2-tetrachloro)-ethyl]-formamide and N,N'-bis-benzyl-ethylenediamine. The yield was 90 percent of theory.

EXAMPLE 5

Using a procedure analogous to that described in Example 1, N,N'-bis-benzyl-N,N'-bis-[(1-formamido-2,2,2-trichloro)-ethyl]-1,3-propylenediamine, an amorphous substance, m. p. about 60° C., was prepared from N-[(1,2,2,2-tetrachloro)-ethyl]-formamide and N,N'-bis-benzyl-1,3-propylenediamine. The yield was 92 percent of theory.

EXAMPLE 6

Using a procedure analogous to that described in Example 1, N-benzyl-N,N'-bis-[(1-formamido-2,2,2-trichloro)-ethyl]-1,3-propylenediamine, an amorphous substance, was prepared from N-[(1,2,2,2-tetrachloro)-ethyl]-formamide and N-benzyl-1,3-propylenediamine. The yield was 90 percent of theory.

EXAMPLE 7

Using a procedure analogous to that described in Example 1, N-benzyl-N,N'-bis-[(1-formamido-2,2,2-trichloro)-ethyl]-ethylenediamine, an amorphous substance, was prepared from N-[(1,2,2,2-tetrachloro)-ethyl]-formamide and N-benzyl-ethylenediamine. The yield was 92 percent of theory.

EXAMPLE 8

Using a procedure analogous to that described in Example 1, N,N'-bis-(p-chloro-phenyl)-N,N'-bis-[(1-formamido-2,2,2-trichloro)-ethyl]-methylenediamine, m. p. 174°–178° C. (decomp.), of the formula

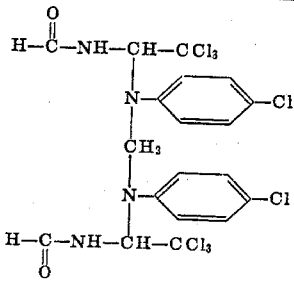

was prepared from N-[(1,2,2,2-tetrachloro)-ethyl]-formamide and bis-(p-chloro-anilino)-methane. The yield was 15 percent of theory.

EXAMPLE 9

Using a procedure analogous to that described in Example 1, N,N'-bis-(3,4-dichloro-phenyl)-N,N'-bis[(1-formamido-2,2,2-trichloro)-ethyl]-methylenediamine, m. p. 198°–202° C. (decomp.), was prepared from N-[(1,2,2,2-tetrachloro)-ethyl]-formamide and bis-(3,4-dichloro-anilino)-methane. The yield was 21 percent of theory.

EXAMPLE 10

Using a procedure analogous to that described in Example 1, N,N'-bis-phenyl-N,N'-bis-[(1-formamido-2,2,2-trichloro)-ethyl]-methylenediamine, m. p. 102°–104° C. (decomp.), was prepared from N-[(1,2,2,2-tetrachloro)-ethyl]-formamide and bis-anilino-methane. The yield was 20 percent of theory.

EXAMPLE 11

Using a procedure analogous to that described in Example 1, N,N'-bis-phenyl-N,N'-bis-[(1-trimethylacetamido-2,2,2-trichloro)-ethyl]-methylenediamine, m. p. 126°–129° C. (decomp.), was prepared from N-[(1,2,2,2-tetrachloro)-ethyl]-trimethylacetamide and bis-anilino-methane. The yield was 33 percent of theory.

EXAMPLE 12

Using a procedure analogous to that described in Example 1, N-(p-chloro-benzyl)-N,N'-bis-](1-formamido-2,2,2-trichloro)ethyl]-ethylenediamine, an amorphous substance, was prepared from N-[(1,2,2,2-tetrachloro)-ethyl]-formamide and N-(p-chloro-benzyl)-ethylenediamine. The yield was 89 percent of theory.

EXAMPLE 13

Using a procedure analogous to that described in Example 1, N-(2-chloro-benzyl)-N,N'-bis-[(1-formamido-2,2,2-trichloro)-ethyl]-ethylenediamine, an amorphous substance, was prepared from N-[(1,2,2,2-tetrachloro)-ethyl]-formamide and N-(2-chloro-benzyl)-ethylenediamine. The yield was 70 percent of theory.

EXAMPLE 14

Using a procedure analogous to that described in Example 1, N-(3,4-dichloro-benzyl)-N,N'-bis-[(1-formamido-2,2,2-trichloro)-ethyl]-ethylenediamine, an amorphous substance, was prepared from N-[(1,2,2,2-tetrachloro)-ethyl]-formamide and N-(3,4-dichloro-benzyl)-ethylenediamine. The yield was 75 percent of theory.

EXAMPLE 15

Using a procedure analogous to that described in Example 1, N-(2,4-dichloro-benzyl)-N,N'-bis-[(1-formamido-2,2,2-trichloro)-ethyl]-ethylenediamine, an amorphous substance, was prepared from N-[(1,2,2,2-tetrachloro)-ethyl]-formamide and N-(2,4-dichloro-benzyl)-ethylenediamine. The yield was 94 percent of theory.

EXAMPLE 16

Using a procedure analogous to that described in Example 1, N,N'-bis-phenyl-N,N'-bis-[(1-acetamido-2,2,2-trichloro)-ethyl]-ethylenediamine, m. p. 208°–210° C. (recrystallized from isopropanol), of the formula

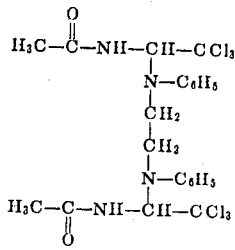

was prepared from N-[(1,2,2,2-tetrachloro)-ethyl]-acetamide and N,N'-bis-phenyl-ethylenediamine.

EXAMPLE 17

Using a procedure analogous to that described in Example 1, N,N'-bis-(2,4-dibromo-phenyl)-N,N'-bis-[(1-acetamido-2,2,2-trichloro)-ethyl]-ethylenediamine, m. p. 142°–144° C. (recrystallized from ethanol/dimethylformamide), of the formula

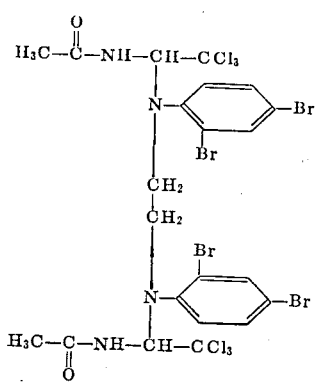

was prepared from N-[(1,2,2,2-tetrachloro)-ethyl]-acetamide and N,N'-bis-(2,4-dibromo-phenyl)-ethylenediamine.

EXAMPLE 18

Using a procedure analogous to that described in Example 1, N,N'-bis-(p-bromo-phenyl)-N,N'-bis-[(1-acetamido-2,2,2-trichloro)-ethyl]-ethylenediamine, m. p. 202°–203° C. (recrystallized from ethanol), of the formula

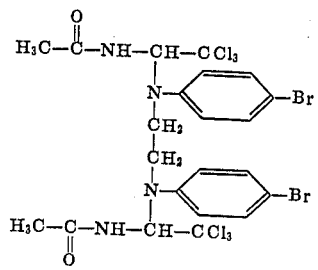

was prepared from N-[(1,2,2,2-tetrachloro)-ethyl]-acetamide and N,N'-bis-(p-bromo-phenyl)-ethylenediamine.

EXAMPLE 19

Using a procedure analogous to that described in Example 1, N-phenyl-N,N'-bis-[(1-formamido-2,2,2-trichloro)-ethyl]-ethylenediamine, an amorphous substance which began to melt at 60° C., of the formula

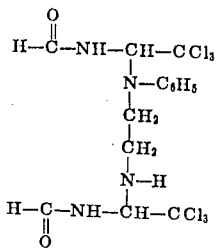

was prepared from N-[(1,2,2,2-tetrachloro)-ethyl]-formamide and N-phenyl-ethylenediamine.

The compounds according to the present invention, that is, those embraced by formula I above, have useful properties. More particularly, the compounds of the invention are highly effective fungicides with very low phytotoxicity; thus they may be effectively used for prophylactic as well as curative treatment of plants against phytopathogenic fungi. For instance, complete prevention against infestation is achieved in the case of a number of true mildew fungi, such as *Erysiphe graminis* and *Erysiphe polygoni*. Furthermore, the compounds according to the invention are effective in combatting rust fungi, such as *Uromyces fabae* and *Puccinia arenariae*; causes of wilting diseases, such as *Verticillium alboatrum*; causes of plant scabs, such as *Venturia inaequalis*; mold fungi, such as *Aspergillus niger*; and various other harmful fungi, such as Fusaria and Ophiobuli.

Particularly noteworthy is the good systemic effect of the novel compounds.

The compounds according to the present invention are also useful as anthelmintics and enhance the germination of seeds, such as pea and cotton seeds.

The compounds of the formula I also exhibit very low toxicity toward warm-blooded animals.

For prophylactic or curative treatment of plants against fungus infestation, the compounds according to the present invention are incorporated as active ingredients into customary fungicidal composition, i.e. compositions consisting essentially of a liquid or comminuted solid inert carrier and an effective fungicidal amount of the active ingredient, such as solutions, emulsion concentrates, suspendable or wettable powders, dusting powders, granulates and sprays. The active ingredient content of these compositions is about 0.5 to 85 percent by weight, preferably 0.5 to 50 percent by weight.

For instance, an emulsion concentrate contains about 0.5 to 20 percent by weight, preferably 5 to 10 percent by weight, of a compound of the Formula I. Suitable solvents for the preparation of emulsion concentrates comprising a compound of the invention as an active ingredient are, for example, mixtures of dimethylformamide or N-methylpyrrolidone with alcohols or glycols. Suitable emulsifiers and wetting agents which may be used for the preparation of such emulsion concentrates are non-ionic compounds, such as nonyl-phenol polyglycol ether, or mixtures of non-ionic and ionic, preferably anionic, compounds as well as ampholytes. The emulsifier content of the emulsion concentrate is about 0.5 to 45 percent by weight, preferably 5 to 25 percent by weight.

The active ingredient content of a wettable powder is about 0.5 to 80 percent by weight, preferably 5 to 25 percent by weight. Suitable emulsifiers and wetting agents which may be used for the preparation of wettable powders are non-ionic or ionic compounds of the type described in the preceding paragraph; the total amount of emulsifier and wetting agent in such wettable powders is about 0.5 to 25 percent by weight, preferably 2 to 25 percent by weight. Suitable powdery inert carriers are, for example, bentonite, kaolin and colloidal silicic acid.

The fungicidal compositions comprising a compound of the present invention as an active ingredient are, if necessary, diluted with water to an active ingredient concentration of 0.5 to 0.00001 percent prior to their use for combatting fungi. Dusting powders may have a higher active ingredient concentration. The upper limit for the application concentration is predicated upon the relatively low phytotoxicity.

The following examples illustrate a few fungicidal compositions comprising a compound of the instant invention as an active ingredient and represent the best mode contemplated of putting the invention to practical use. The percentages are percent by weight.

EXAMPLE 20

Dusting Powder
| | |
|---|---|
| Compound of Example 1 | 1% |
| Talcum | 98% |
| Methylcellulose | 1% |

The components are admixed with each other, and the mixture is milled until homogeneous.

EXAMPLE 21

Wettable Powder

| | |
|---|---|
| Compound of Example 2 | 25% |
| Kaolin | 55% |
| Colloidal silicic acid | 10% |
| Lignin sulfonate (dispersing agent) | 9% |
| Sodium tetrapropylene benzene sulfonate (wetting agent) | 1% |

The components are admixed, the mixture is milled until homogeneous, and prior to use the powder is suspended in an amount of water such that the active ingredient concentration in the aqueous suspension is from 0.00001 to 0.5 percent by weight.

EXAMPLE 22

Emulsion Concentrate
| | |
|---|---|
| Compound of Example 3 | 10% |
| Sodium tetrapropylene benzene sulfonate (anionic emulsifier) | 5% |
| Nonylphenol polyglycol ether (non-ionic emulsifier) | 20% |
| Propyleneglycol | 32.5% |
| N-Methylpyrrolidone | 32.5% |

The components are uniformly admixed with each other, and prior to use the resulting concentrate is diluted with water to the desired active ingredient content between 0.00001 and 0.5 percent by weight.

EXAMPLE 23

Aerosol Spray
| | |
|---|---|
| Compound of Example 4 | 0.05% |
| Sesame oil | 0.10% |
| N-Methylpyrrolidone | 10.00% |
| Propellant gas | 89.85% |

The components are admixed in customary fashion, and the mixture is charged into aerosol containers provided with a spray valve.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. A compound of the formula

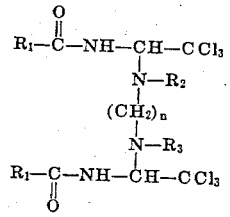

wherein
  $R_1$ is hydrogen, alkyl of one to four carbon atoms or trichloromethyl,
  $R_2$ is phenyl, benzyl, chlorophenyl, dichlorophenyl, chlorobenzyl, dichlorobenzyl, bromophenyl or dibromophenyl,
  $R_3$ is hydrogen, phenyl, benzyl or dichlorophenyl, bromophenyl or dibromophenyl, and
  $n$ is 1, 2 or 3.

2. A compound according to claim 1, which is N,N'-bis-phenyl-N,N'-bis-[(1-formamido-2,2,2-trichloro)-ethyl]-ethylenediamine.

3. A compound according to claim 1, which is N,N'-bis-phenyl-N,N'-bis-[(1-pivaloylamino-2,2,2-trichloro)-ethyl]-ethylenediamine.

4. A compound according to claim 1, which is N,N'-bis-phenyl-N,N'-bis-[(1-trichloroacetamido-2,2,2-trichloro)-ethyl]-ethylenediamine.

5. A compound according to claim 1, which is N,N'-bis-benzyl-N,N'-bis-[(1-formamido-2,2,2-trichloro)-ethyl]-ethylenediamine.

6. A compound according to claim 1, which is N,N'-bis-benzyl-N,N'-bis-[(1-formamido-2,2,2-trichloro)-ethyl]-1,3-propylenediamine.

7. A compound according to claim 1, which is N-benzyl-N,N'-bis-[(1-formamido-2,2,2-trichloro)-ethyl]-1,3-propylenediamine.

8. A compound according to claim 1, which is N-benzyl-N,N'-bis-[(1-formamido-2,2,2-trichloro)-ethyl]-ethylenediamine.

9. A compound according to claim 1, which is N,N'-bis-(p-chloro-phenyl)-N,N'-bis-[(1-formamido-2,2,2-trichloro)-ethyl]-methylenediamine.

10. A compound according to claim 1, which is N,N'-bis-(3,4-dichlorophenyl)-N,N'-bis[(1-formamido-2,2,2-trichloro)-ethyl]-methylenediamine.

11. A compound according to claim 1, which is N,N'-bis-phenyl-N,N'-bis[(1-formamido-2,2,2-trichloro)-ethyl]-methylenediamine.

12. A compound according to claim 1, which is N,N'-bis-phenyl-N,N'-bis-[(1-trimethylacetamido-2,2,2-trichloro)-ethyl]-methylenediamine.

13. A compound according to claim 1, which is N-(p-chloro-benzyl)-N,N'-bis-[(1-formamido-2,2,2-trichloro)-ethyl]-ethylenediamine.

14. A compound according to claim 1, which is N-(2-chloro-benzyl)-N,N'-bis-[(1-formamido-2,2,2-trichloro)-ethyl]-ethylenediamine.

15. A compound according to claim 1, which is N-(3,4-dichloro-benzyl)-N,N'-bis[(1-formamido-2,2,2-trichloro)-ethyl]-ethylenediamine.

16. A compound according to claim 1, which is N-(2,4-dichloro-benzyl)-N,N'-bis-[(1-formamido-2,2,2-trichloro)-ethyl]-ethylenediamine.

17. A compound according to claim 1, which is N,N'-bis-phenyl-N,N'-bis[(1-acetamido-2,2,2-trichloro)-ethyl]-ethylenediamine.

18. A compound according to claim 1, which is N,N'-bis-(2,4-dibromo-phenyl)-N,N'-bis-[(1-acetamido-2,2,2-trichloro)-ethyl]-ethylenediamine.

19. A compound according to claim 1, which is N,N'-bis-(p-bromo-phenyl)-N,N'-bis-[(1-acetamido-2,2,2-trichloro)-ethyl]-ethylenediamine.

20. A compound according to claim 1, which is N-phenyl-N,N'-bis-[(1-formamido-2,2,2-trichloro)-ethyl]-ethylenediamine.

* * * * *